United States Patent
Kagami et al.

(10) Patent No.: US 6,760,863 B1
(45) Date of Patent: Jul. 6, 2004

(54) CPU UNIT AND RUN ALTERNATIVE CONTROL METHOD OF PROGRAMMABLE CONTROLLER

(75) Inventors: Hiroyuki Kagami, Tokyo (JP); Hiroki Sugamata, Aichi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/806,562

(22) PCT Filed: Apr. 9, 1999

(86) PCT No.: PCT/JP99/01882
§ 371 (c)(1),
(2), (4) Date: Mar. 30, 2001

(87) PCT Pub. No.: WO00/62134
PCT Pub. Date: Oct. 19, 2000

(51) Int. Cl.[7] .............................................. G06F 11/00
(52) U.S. Cl. ....................................................... 714/16
(58) Field of Search ........................... 714/16, 20, 21, 714/26, 27, 6, 7, 38; 711/133, 134, 159; 710/8, 15, 17

(56) References Cited

U.S. PATENT DOCUMENTS

| | | | | |
|---|---|---|---|---|
| 4,181,940 A | * | 1/1980 | Underwood et al. | 714/25 |
| 4,270,168 A | * | 5/1981 | Murphy et al. | 714/10 |
| 4,377,000 A | * | 3/1983 | Staab | 714/55 |
| 4,807,228 A | * | 2/1989 | Dahbura et al. | 714/13 |
| 5,530,844 A | * | 6/1996 | Phillips et al. | 709/213 |
| 5,581,768 A | * | 12/1996 | Garney et al. | 709/104 |
| 5,664,195 A | * | 9/1997 | Chatterji | 717/178 |
| 5,742,785 A | * | 4/1998 | Stone et al. | 712/217 |
| 6,260,068 B1 | * | 7/2001 | Zalewski et al. | 709/226 |

FOREIGN PATENT DOCUMENTS

| | | | | |
|---|---|---|---|---|
| JP | 62-262102 | 11/1987 | | G05B/9/03 |
| JP | 4-182801 | 6/1992 | | G05B/9/02 |

* cited by examiner

Primary Examiner—Nadeem Iqbal
(74) Attorney, Agent, or Firm—Sughrue Mion, PLLC

(57) ABSTRACT

A CPU unit comprising a microprocessor for controlling a controlled system according to a stored sequence program and predetermined data, and a memory area where the sequence program and predetermined data are stored and a second sequence predetermined data both used by a preset operation proxy controlled unit are stored, wherein when the microprocessor detects an abnormality of the operation proxy controlled unit, the microprocessor controls the operation proxy controlled unit according to the second sequence program and second predetermined data after the microprocessor ends the predetermined processings of the unit.

7 Claims, 10 Drawing Sheets

CPU UNIT AND RUN ALTERNATIVE CONTROL METHOD OF PROGRAMMABLE CONTROLLER

TECHNICAL FIELD

The present invention relates to a CPU unit and a run alternative control method of a programmable controller for replacing the CPU unit in which an abnormality occurs while continuing administration of a system and recovering the system in multi-CPU control in which programmable controller CPU units (hereinafter called "CPU unit") used in industrial equipment etc. form respectively independent systems and perform distributed processing.

BACKGROUND ART

FIG. 10 is a schematic configuration diagram showing a schematic configuration in conventional multi-CPU control, and each CPU unit controls I/O units which are respectively independent and are controlled objects and these CPU units are connected in plurality through a bus and multi-CPU control runs for performing distributed control of a series of all the systems are made.

Incidentally, in the description, a state of the case that an abnormality occurs in one of the CPU units at the time of the multi-CPU control runs will be described.

In the drawing, numeral 11 is a CPU unit for controlling controlled object equipment such as industrial equipment based on stored sequence programs, and numeral 12 is an I/O unit which connects the controlled object equipment and is controlled by the CPU unit 1, and numeral 13 is a bus.

Here, a system A is constructed of a CPU unit 11A and an I/O unit 12A, and a system B is constructed of a CPU unit 11B and an I/O unit 12B. Then, the system A and the system B are connected through the bus 3 and a multi-CPU control system is formed.

The CPU unit 11 comprises a microprocessor (MPU) 14 for transferring and analyzing data according to information on an OS program, an OS storage area 15 in which the OS program for controlling this microprocessor 14 is stored, a memory area 16 in which sequence programs etc. for performing sequence control created by a user are stored, and two-port memory 17 for communication between CPU units for conducting communications between the CPU units through the bus 13 in multi-CPU control.

Then, the memory area 16 is divided into a program area 161 for storing a sequence program which a user creates, a device memory area 162 for storing a device state for handling a state or a numeric value of an input/output signal in this sequence program, and a parameter area 163 for storing parameters for defining functions of the CPU unit 1.

Incidentally, in any of the system A and the system B independent each other, a controlled object and operations for performing control are different, but the inside of the CPU unit 11 is constructed by the substantially same functions.

Next, processing of the case that an abnormality occurs due to an occurrence of failures etc. of a power source in the CPU unit 11A which is one of the CPU units at the time of the multi-CPU control runs will be described.

Conventionally, at the time of multi-CPU control in a system configuration of FIG. 10, each the CPU unit respectively operates by the individual sequence program and the parameter, etc., so that when an abnormality occurs in the CPU unit 11A, sequence control which has been performed by the CPU unit 11A in which the abnormality occurs cannot be performed by alternative execution of the other CPU unit 11B and control to the I/O unit 12A based on the CPU unit 11A stops and all the systems cannot be continued in a manner similar to that before the abnormality occurs.

As a result of that, when the abnormality occurs due to failures etc. in the CPU unit 11A, the system A constructed of the CPU unit 11A stops.

Thus, a user replaces the CPU unit 11A in which the abnormality has occurred with another normal CPU unit, and writes the sequence program written into the CPU unit 11A in which the abnormality has occurred into the replaced CPU unit, and operates the replaced CPU unit to resume the system.

In the control based on the programmable controller of today, in view of performing a larger number of control, a plurality of the CPU units are provided and the control based on the multi-CPU described above is performed.

Conventionally, when a CPU unit in which an abnormality occurs is present during distributed processing in multi-CPU units, until a user replaces the CPU unit 11A in which the abnormality has occurred with another normal CPU unit and writes the sequence program written into the CPU unit 11A in which the abnormality has occurred into the replaced CPU unit and operates the replaced CPU unit, a system A in which the CPU unit 11A performs the distributed processing remains stopped and even if the system A recovers, there was a problem in that all the systems cannot be continued in a manner similar to that before the abnormality occurs.

Also, when the CPU unit in which the abnormality has occurred is replaced with another CPU unit in the case of recovering this system, the sequence program of the CPU unit in which the abnormality has occurred must be stored previously, so that it took time and effort for the user to recover the whole systems in a manner similar to that before the abnormality occurs.

Also, as associated alternative control methods at the object equipment based on a sequence program and predetermined data stored, and a memory area for introducing and storing a second sequence program at the time of an initial processing on system activation, and second predetermined data at the time of END processing after completion of a sequence processing, which a run alternative control object unit preset uses while storing the sequence program and the predetermined data, and when the microprocessor detects an abnormality of the run alternative control object unit, the run alternative control object unit is controlled based on the second sequence program and the second predetermined data stored in the memory area after the completion of predetermined sequence processing in the self unit.

Also, when the second sequence program and the second predetermined data are stored in the memory area, they are acquired from the run alternative control object unit connected through an internal bus via shared memory.

Also, an area for storing the second sequence program and the second predetermined data is provided in the shared memory and the data written from the run alternative control object unit is acquired in the memory area with reference to a predetermined decision flag.

Also, it is determined whether there is an abnormality object equipment based on a sequence program and predetermined data stored, and a memory area for storing a second sequence program and second predetermined data which a run alternative control object unit preset uses while storing the sequence program and the predetermined data, and when the microprocessor detects an abnormality of the run alternative control object unit, the run alternative control object unit is controlled based on the second sequence program and the second predetermined data stored in the memory area after the completion of predetermined sequence processing in the self unit.

Also, when the second sequence program and the second predetermined data are stored in the memory area, they are acquired from the run alternative control object unit connected through an internal bus via shared memory.

Also, the acquisition of the second sequence program is performed at the time of initial processing on system activation and the acquisition of the second predetermined data is performed at the time of END processing after the completion of sequence processing.

Also, an area for storing the second sequence program and the second predetermined data is provided in the shared memory and the data written from the run alternative control object unit is acquired in the memory area with reference to a predetermined decision flag.

Also, it is determined whether there is an abnormality of the run alternative control object unit or not based on the presence or absence of writing of the second predetermined data written from the run alternative control object unit through the shared memory.

Further, there is provided transfer means for transferring the previously received second sequence program and the second predetermined data to the recovered run alternative control object unit when it is detected that the run alternative control object unit has recovered from an abnormality.

Also, a run alternative control method of a programmable controller according to the invention comprises a first step of acquiring a sequence program, at the time of an initial processing on system activation, which is necessary to control a run alternative control object unit, a device and a parameter for run alternative control object unit at the time of an END processing after completion of a sequence processing of the run alternative control object unit itself, a second step of detecting an abnormality of the run alternative control object unit, and a third step of controlling the run alternative control object unit based on the information acquired in the first step after the completion of predetermined sequence processing in the self unit when the abnormality of the run alternative control object unit has been detected.

Further, there is provided a step for transferring the previously received sequence program, the device and the parameter for run alternative control object unit to the recovered run alternative control object unit when it is detected that the run alternative control object unit has recovered from an abnormality.

BEST MODE FOR CARRYING OUT THE INVENTION

First Embodiment

A first embodiment of the invention will be described using drawings.

Figure 1:
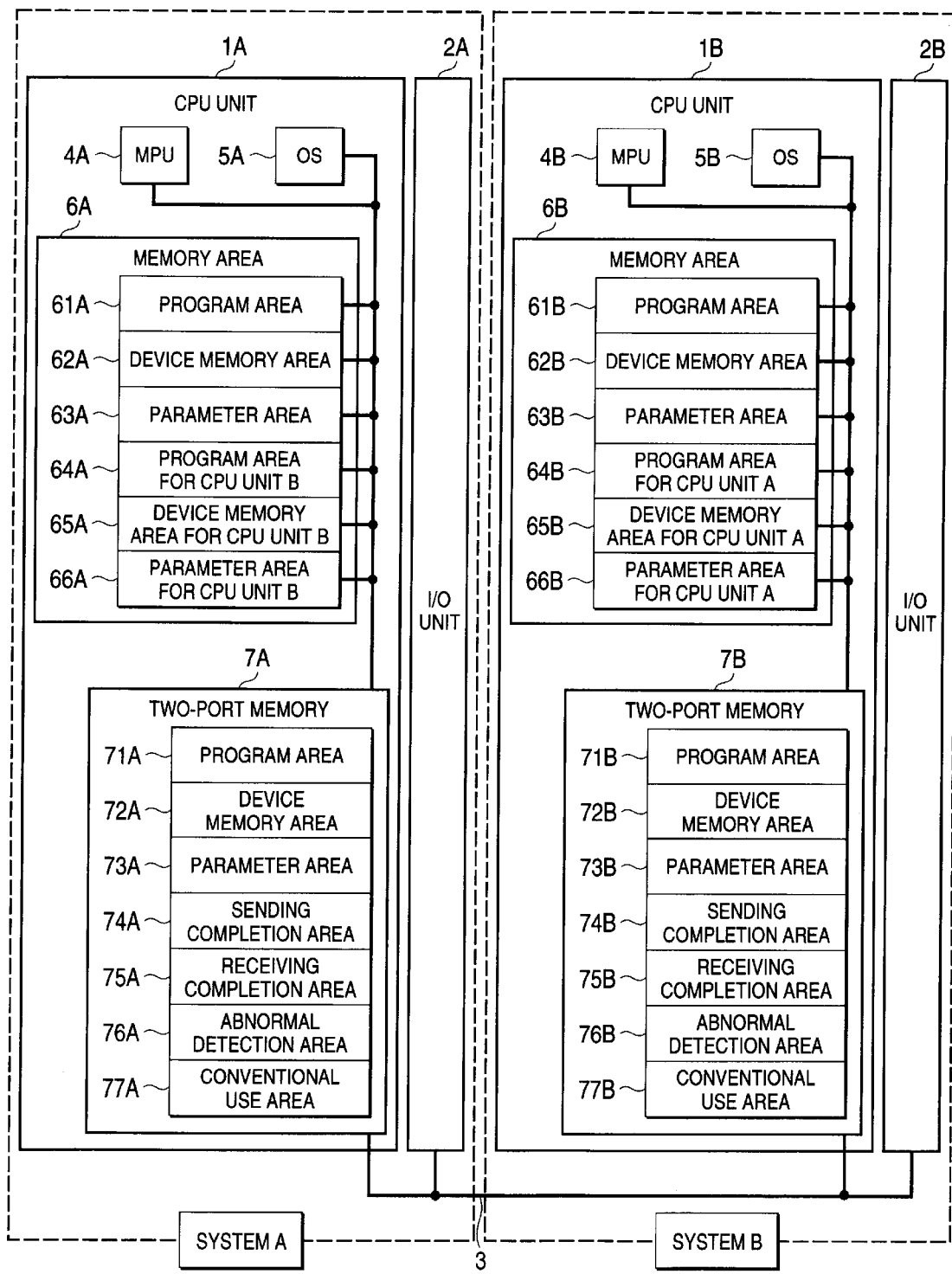
FIG. 1 is a schematic configuration diagram showing a schematic configuration in multi-CPU control.

FIG. 1 is a schematic configuration diagram showing a schematic configuration in multi-CPU control, and each CPU unit controls I/O units which are respectively independent and are controlled objects and these CPU units are connected in plurality through a bus and multi-CPU control runs for performing distributed control of a series of all the systems are made.

Incidentally, in the description, a state of the case that an abnormality occurs in one of the CPU units at the time of the multi-CPU control runs will be described.

In the drawing, numeral 1 is a CPU unit for controlling controlled object equipment such as industrial equipment based on stored sequence programs, and numeral 2 is an I/O unit which connects the controlled object equipment and is controlled by the CPU unit 1, and numeral 3 is a bus and, for example, is placed inside a base unit in which the CPU unit and the I/O unit are mounted.

Here, a system A is constructed of a CPU unit 1A and an I/O unit 2A, and a system B is constructed of a CPU unit 1B and an I/O unit 2B. Then, the system A and the system B are connected through the bus 3 and a multi-CPU control system is formed.

The CPU unit 1 comprises a microprocessor (MPU) 4 for transferring and analyzing data according to information on an OS program, an OS storage area 5 in which the OS program for controlling this microprocessor 4 is stored, a memory area 6 in which sequence programs etc. for performing sequence control created by a user are stored, and two-port memory 7 for communication between CPU units for conducting communications between the CPU units through the bus 3 in multi-CPU control.

Then, the memory area 6 is divided into a program area 61 for storing a sequence program which a user creates, a device memory area 62 for storing a device state for handling a state or a numeric value of an input/output signal in this sequence program, a parameter area 63 for storing a parameter for defining functions of the CPU unit 1, a program area 64 for storing a sequence program processed in the CPU unit for performing run alternative control corresponding to a second sequence program, a device memory area 65 for storing a device state for handling a state or a numeric value of an input/output signal in this sequence program corresponding to a second predetermined data, and a parameter area 66 for storing a parameter for defining functions of the CPU unit B corresponding to the second predetermined data.

Also, the two-port memory 7 comprises a program area 71 for storing a sequence program, a device memory area 72 for storing a device state, a parameter area 73 for storing a parameter, a sending completion area 74 turned on at the time when the microprocessor 4 of the CPU unit for performing run alternative control successfully transfers information on the program area 61, the device memory area 62 and the parameter area 63 to the program area 71, the device memory area 72 and the parameter area 73 of the two-port memory 7, a receiving completion area 75 turned on at the time when information present in the program area 71, the device memory area 72 and the parameter area 73 of the two-port memory 7 is successfully transferred to the program area 61, the device memory area 62 and the parameter area 63, an abnormal detection area 76 turned on at the time when an abnormality is detected in the CPU unit 1 for performing the run alternative control, and a conventional use area 77 conventionally intended for use of this two-port memory 7 and so on.

Incidentally, in any of the system A and the system B independent each other, a controlled object and operations for performing control are different, but the inside of the CPU unit 1 is constructed by the substantially same functions.

That is, in the system A in the embodiment, the CPU unit 1A has the MPU 4A, the OS storage area 5A, the memory area 6A and the two-port memory 7A, and in the system B, the CPU unit 1B has the MPU 4B, the OS storage area 5B, the memory area 6B and the two-port memory 7B.

Incidentally, the memory area 6A in the system A comprises a program area 61A, a device memory area 62A, a parameter area 63A, a program area 64A for CPU unit B for storing a sequence program processed in the CPU unit 1B for performing run alternative control, a device memory area 65A for CPU unit B for storing a device state in a sequence program for CPU unit B, and a parameter area 66A for CPU unit B for storing a parameter for defining functions of the CPU unit 1B, and also the memory area 6B in the system B has the substantially same configuration and an object of the run alternative control only changes to the CPU unit 1A.

Also, the two-port memory 7A in the system A comprises a program area 71A, a device memory area 72A and a parameter area 73A for storing a sequence program, a device state and a parameter for the CPU unit 1B, a sending completion area 74A turned on at the time when the MPU 4B of the CPU unit 1B for performing run alternative control successfully transfers information on a program area 61B, a device memory area 62B and a parameter area 63B to the program area 71A, the device memory area 72A and the parameter area 73A of the two-port memory 7A, a receiving completion area 75A turned on at the time when information present in a program area 71B, a device memory area 72B and a parameter area 73B of the two-port memory 7B is successfully transferred to the program area 61B, the device memory area 62B and the parameter area 63B, an abnormal detection area 76A turned on at the time when an abnormality is detected in the CPU unit 1B for performing the run alternative control, and a conventional use area 77A conventionally intended for use of this two-port memory 7 and so on, and also the two-port memory 7B in the system B has the substantially same configuration and an object of the run alternative control only changes to the CPU unit 1A.

Figure 2:
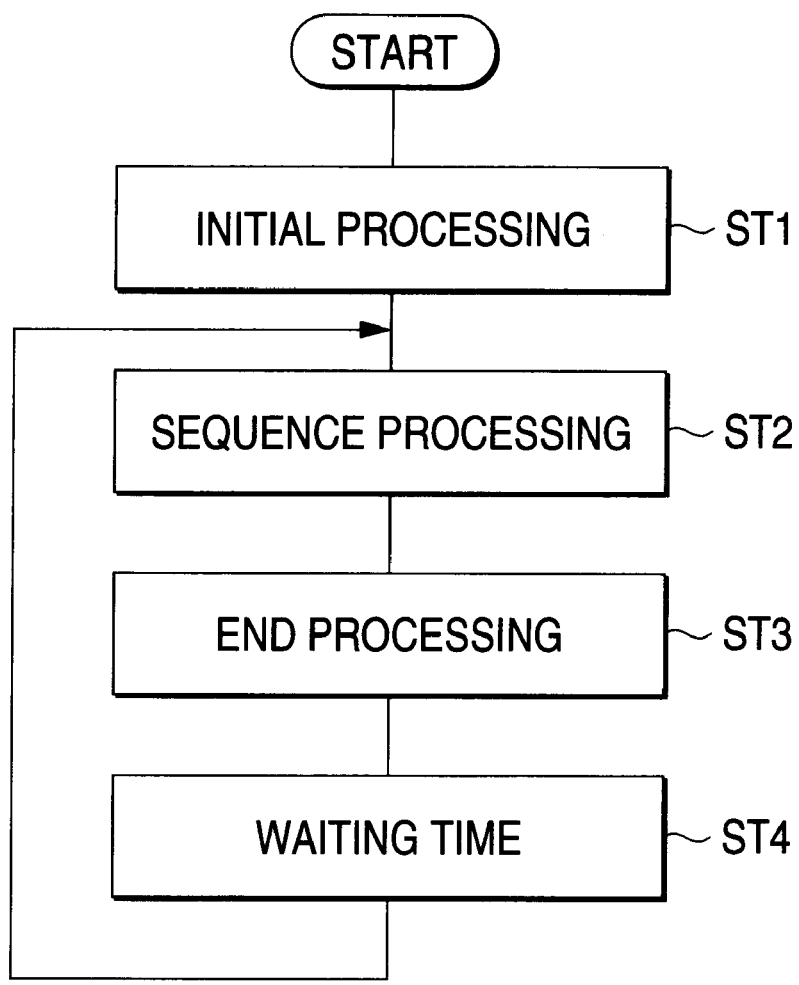
FIG. 2 is a processing flow showing sequence processing which a CPU unit performs.

Next, a mechanism in which the CPU unit 1 performs sequence control will be described using FIG. 2.

Incidentally, when a user performs sequence control, in order to execute a program while keeping sequence processing per one time at constant time, a constant scan is set to perform the sequence control. Here, the constant scan is set by a parameter and is constructed by time in which waiting time is added to sequence program execution time and END processing time.

Processing of the case that the CPU unit 1 performs the sequence control is chiefly classified into four portions, and when a user turns on a power source, initial processing (step ST1) for checking whether each the unit constructing a system controlled by the programmable controller CPU unit is normal or not or setting each initial value to devices is first performed.

Next, in order to perform the sequence control, sequence processing for executing a sequence program is performed (step ST2) and thereafter, END processing for updating a device value etc. is performed (step ST3).

Then, waiting is performed until it becomes the constant scan preset to keep the sequence processing per one time at the constant time (step ST4).

Subsequently, the sequence processing is again performed and the sequence control is performed while repeating this sequence processing and the END processing.

Incidentally, in the case of performing run alternative control, since sequence processing of a system which a primary programmable controller CPU unit constructs and sequence processing of a system which a programmable controller CPU unit for performing run alternative control constructs are performed, a user presets the constant scan in the case of performing the run alternative control by a parameter.

Next, means in which the microprocessor 4A of the CPU unit 1A for requesting run alternative control as initial processing gives information on the program area 61A, the device memory area 62A and the parameter area 63A to the CPU unit 1B for performing the run alternative control will be described using a processing flow of FIG. 3.

First, the microprocessor 4A of the CPU unit 1A transfers information on the program area 61A, the device memory area 62A and the parameter area 63A to the program area 71B, the device memory area 72B and the parameter area 73B of the two-port memory 6B of the CPU unit 1B through the bus 3 (step ST11).

Then, when the transfer succeeds, in step ST14, the sending completion area 74B on the two-port memory 7B of the CPU unit 1B is turned on.

In step ST12, when the transfer fails, in case that even attempts of a constant number of times or more do not succeed in step ST13, an abnormality is present in the CPU unit 1B for performing the run alternative control, so that the initial processing is ended as it is.

The microprocessor 4B of the CPU unit 1B for performing the run alternative control transfers information on the program area 71B, the device memory area 72B and the parameter area 73B of the two-port memory 7B to the program area 64B for CPU unit A, the device memory area 65B for CPU unit A and the parameter area 66B for CPU unit A, and when the transfer succeeds, the receiving completion area 75A on the two-port memory 7A is turned on.

In step ST15, the CPU unit 1A determines whether the receiving completion area 75A on the two-port memory 7A is ON or not and when the microprocessor 4A makes sure that the receiving completion area 75A is ON, an operation proceeds to step ST17 and the receiving completion area 75A of the two-port memory 7A is turned off and the initial processing of the CPU unit 1A is completed.

Also, on the other hand, when the receiving completion area 75A is OFF, in case that constant time elapses (step ST16), an abnormality is present in the CPU unit 1B for performing the run alternative control, so that the initial processing is ended as it is.

Next, means in which the microprocessor 4B of the CPU unit 1B receives information on the program area 61A, the device memory area 62A and the parameter area 63A as initial processing will be described using a processing flow of FIG. 4.

Figure 3:
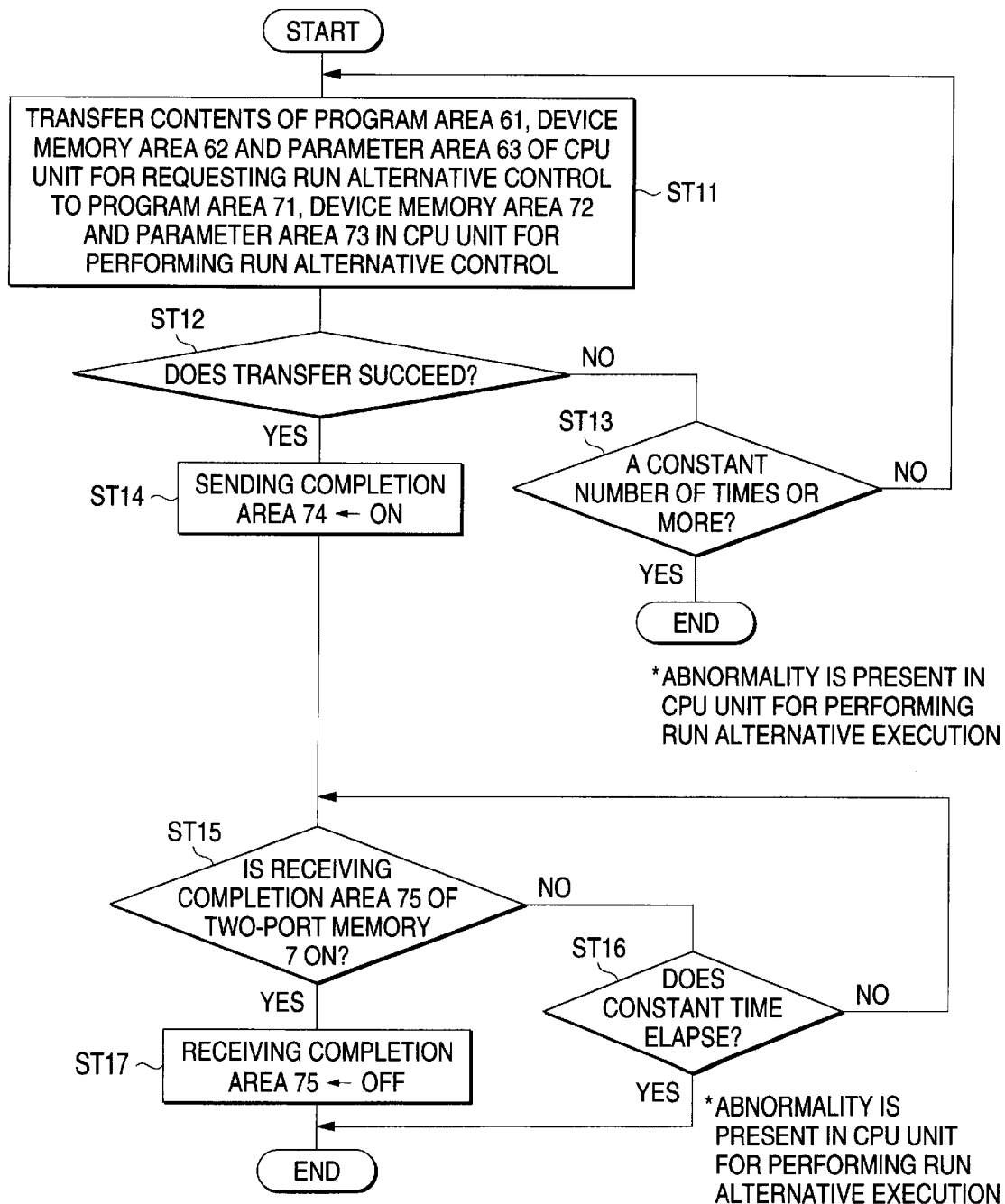
FIG. 3 is a processing flow showing processing in which a microprocessor gives information on a program area, a device memory area and a parameter area at the time of initial processing.
Figure 4:
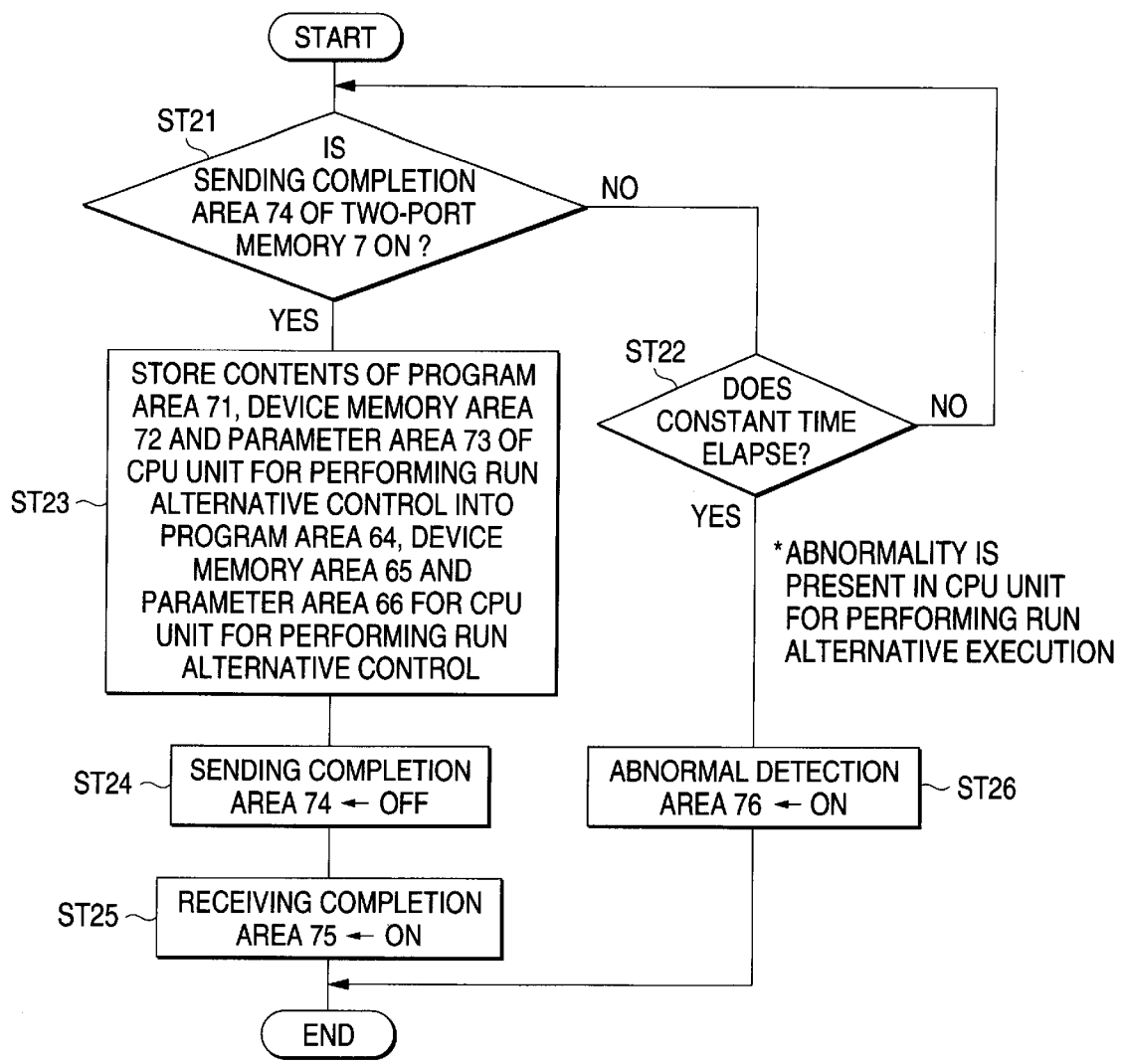
FIG. 4 is a processing flow showing processing in which the microprocessor receives information on the program area, the device memory area and the parameter area at the time of initial processing.

Here, the processing shown in FIG. 3 and FIG. 4 is added to the end of the initial processing (step ST1) of an OS program before sequence program execution of processing of conventional CPU units.

In step ST21, the microprocessor 4B checks whether the sending completion area 74B on the two-port memory 7B is ON or not.

If the sending completion area 74B is ON, information on the program area 61A, the device memory area 62A and the parameter area 63A of the CPU unit 1A for requesting run alternative control is written into the program area 71B, the device memory area 72B and the parameter area 73B of the two-port memory 7B, so that a transfer from the program area 71B, the device memory area 72B and the parameter area 73B of the two-port memory 7B to the program area 64B for CPU unit A, the device memory area 65B for CPU unit A and the parameter area 66B for CPU unit A is made (step ST23), and the sending completion area 74B present on the two-port memory 7B is turned off (step ST24).

Then, in step ST25, the receiving completion area 75A on the two-port memory 7A of the CPU unit 1A is turned on through the bus 3.

On the other hand, if the sending completion area 74B is OFF, it is determined whether constant time elapses or not in step ST22 and if so, it is considered that an abnormality is present in the CPU unit 1A for requesting the run alternative control in step ST26, and the abnormal detection area 76B present on the two-port memory 7B is turned on.

Next, means of the case that the microprocessor 4A of the CPU unit 1A gives information on the device memory area 62A to the CPU unit 1B for performing run alternative execution in END processing performed after completing the sequence processing for executing the sequence program will be described using a processing flow of FIG. 5.

Incidentally, this processing is added to the end of the END processing (step ST3) for updating information on device memory of processing of conventional CPU units.

The contents of the device memory for handling a state or a numeric value of an input/output signal in the sequence program change every moment during execution of the sequence program.

As a result of that, the CPU unit for performing run alternative control needs to update periodically the information on the device memory to the CPU unit for requesting the run alternative execution. Also, it is necessary to periodically check whether the CPU unit for performing the run alternative control operates normally or not.

First, in step ST31, the microprocessor 4A of the CPU unit 1A for requesting the run alternative control transfers information on the device memory area 62A to the device memory area 72B of the two-port memory 7B of the CPU unit 1B through the bus 3.

Then, when the transfer succeeds (step ST32), in step ST34, the sending completion area 74B on the two-port memory 7B of the CPU unit 1B is turned on.

On the other hand, when the transfer fails, in case that even attempts of a constant number of times or more do not succeed (step ST33), an abnormality is present in the CPU unit 1B for performing the run alternative control, so that the END processing is ended as it is.

The microprocessor 4B of the CPU unit 1B for performing the run alternative control transfers information on the device memory area 72B of the two-port memory 7B to the device memory area 65B for CPU unit A, and when the transfer succeeds, the receiving completion area 75A on the two-port memory 7A is turned on.

In step ST35, the CPU unit 1A determines whether the receiving completion area 75A of the two-port memory 7A is ON or not and when the microprocessor 4A makes sure that the receiving completion area 75A is ON, an operation proceeds to step ST17 and the receiving completion area 75A of the two-port memory 7A is turned off and the END processing of the CPU unit 1A is completed.

On the other hand, when the receiving completion area 75A is OFF, an operation proceeds to step ST36 and it is determined whether constant time elapses or not and if so, an abnormality is present in the CPU unit 1B for performing the run alternative control, so that the END processing is ended as it is.

Next, means in which the microprocessor 4B of the CPU unit 1B receives information on the device memory area 62A as END processing will be described using a processing flow of FIG. 6.

Figure 5:
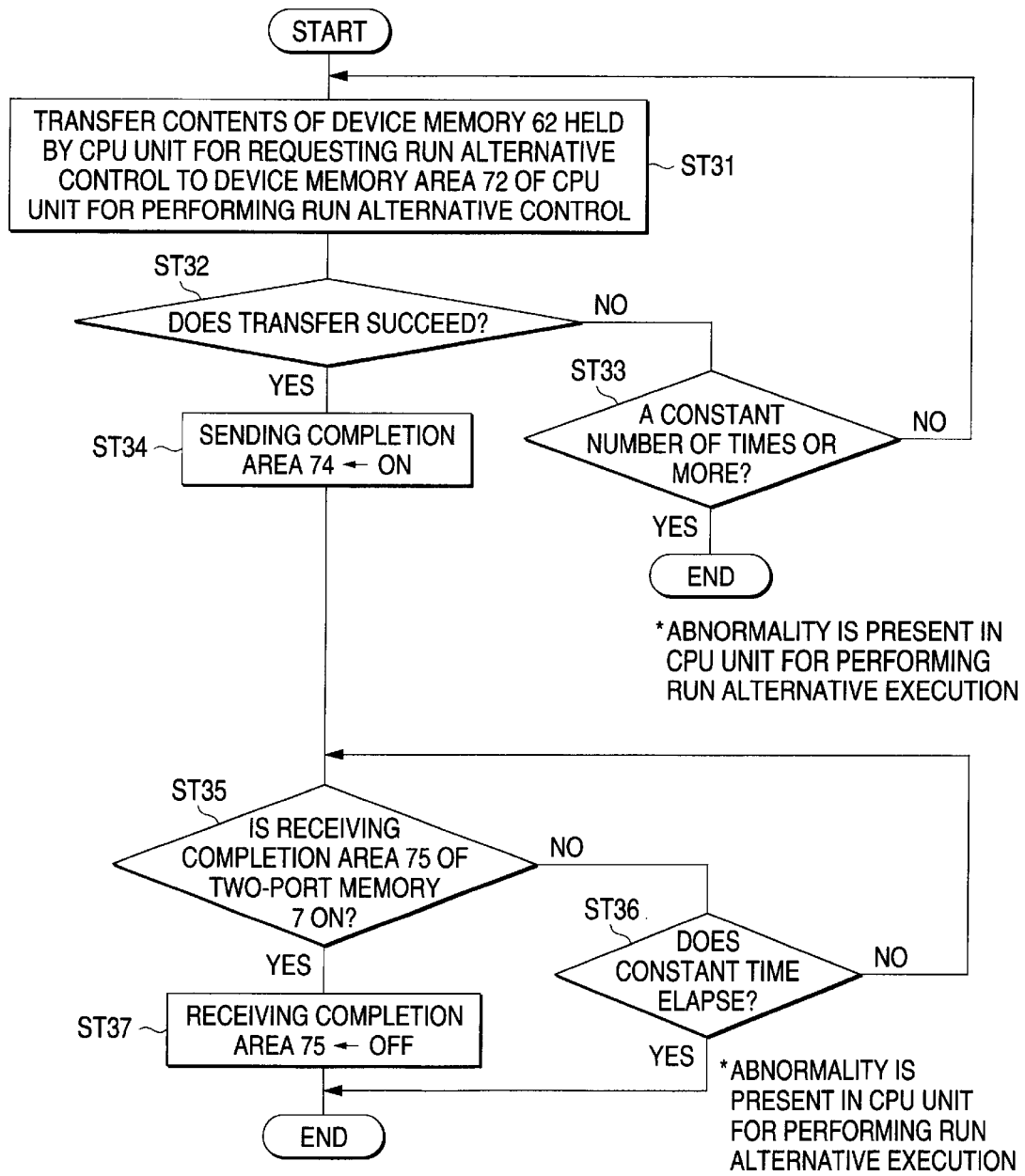
FIG. 5 is a processing flow showing processing in which the microprocessor gives information on the device memory area at the time of END processing.
Figure 6:
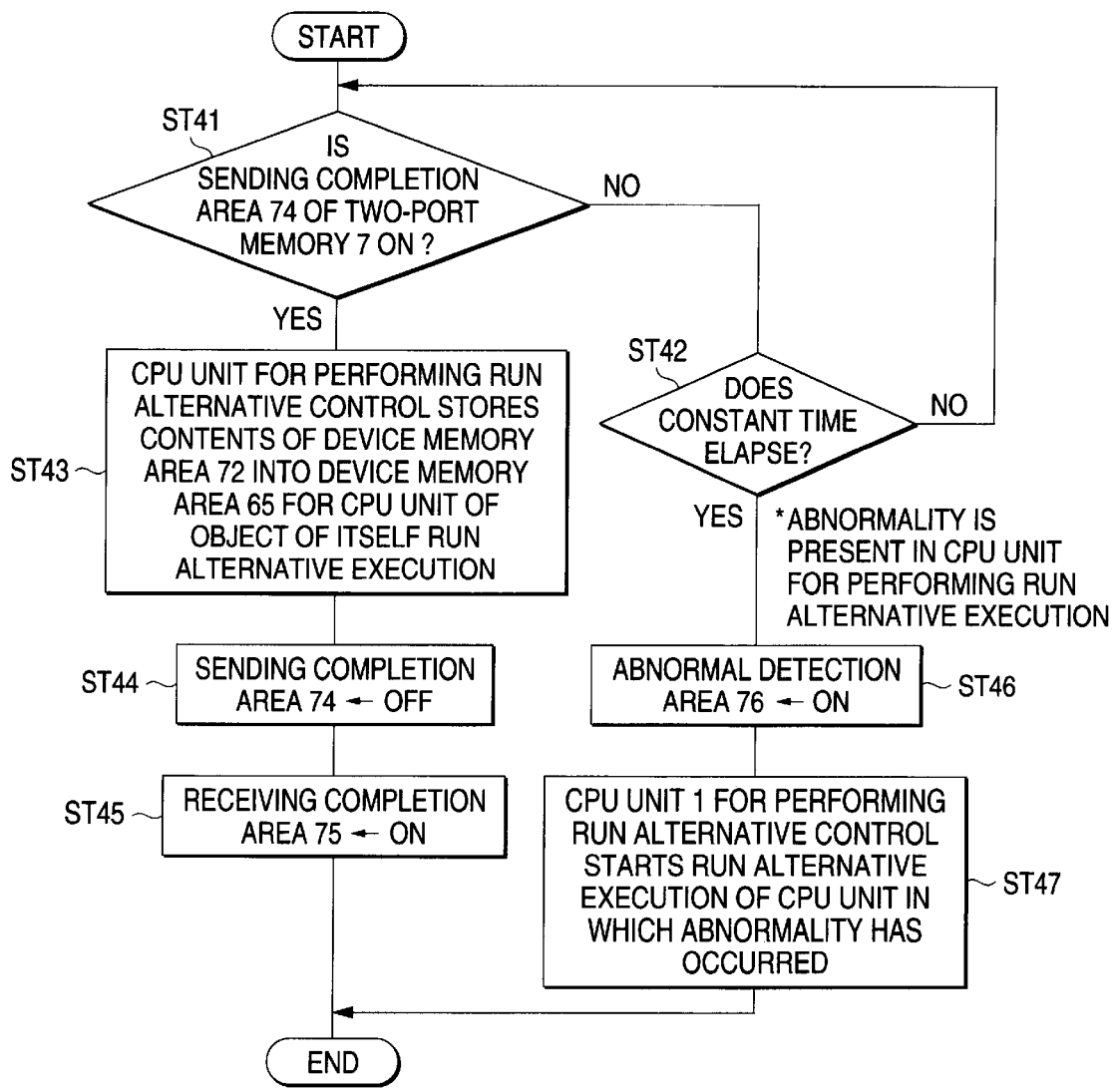
FIG. 6 is a processing flow showing processing in which the microprocessor receives information on the device memory area at the time of END processing.

Here, the processing shown in FIG. 5 and FIG. 6 is added to the end of the END processing (step ST3) of an OS program before sequence program execution of processing of conventional CPU units.

Instep ST41, it is checked whether the sending completion area 74B on the two-port memory 7B is ON or not.

If the sending completion area 74B is ON, information on the device memory area 62A of the CPU unit 1A is transferred to the device memory area 72B on the two-port memory 7B, so that in step ST43, a transfer from the two-port memory 7B to the device memory area 65B for CPU unit A is made and thereafter, the sending completion area 74B present on the two-port memory 7B is turned off.

Then, in step ST45, the receiving completion area 75A on the two-port memory 7A of the CPU unit 1A is turned on through the bus 3.

On the other hand, if the sending completion area 74B is OFF, it is determined whether constant time elapses or not in step ST42 and if so, an operation proceeds to step ST46 and it is considered that an abnormality is present in the CPU unit 1A for requesting the run alternative control in step ST26, and the abnormal detection area 76B present on the two-port memory 7B is turned on and the run alternative control of the CPU unit 1A is started (step ST47).

Figure 7:
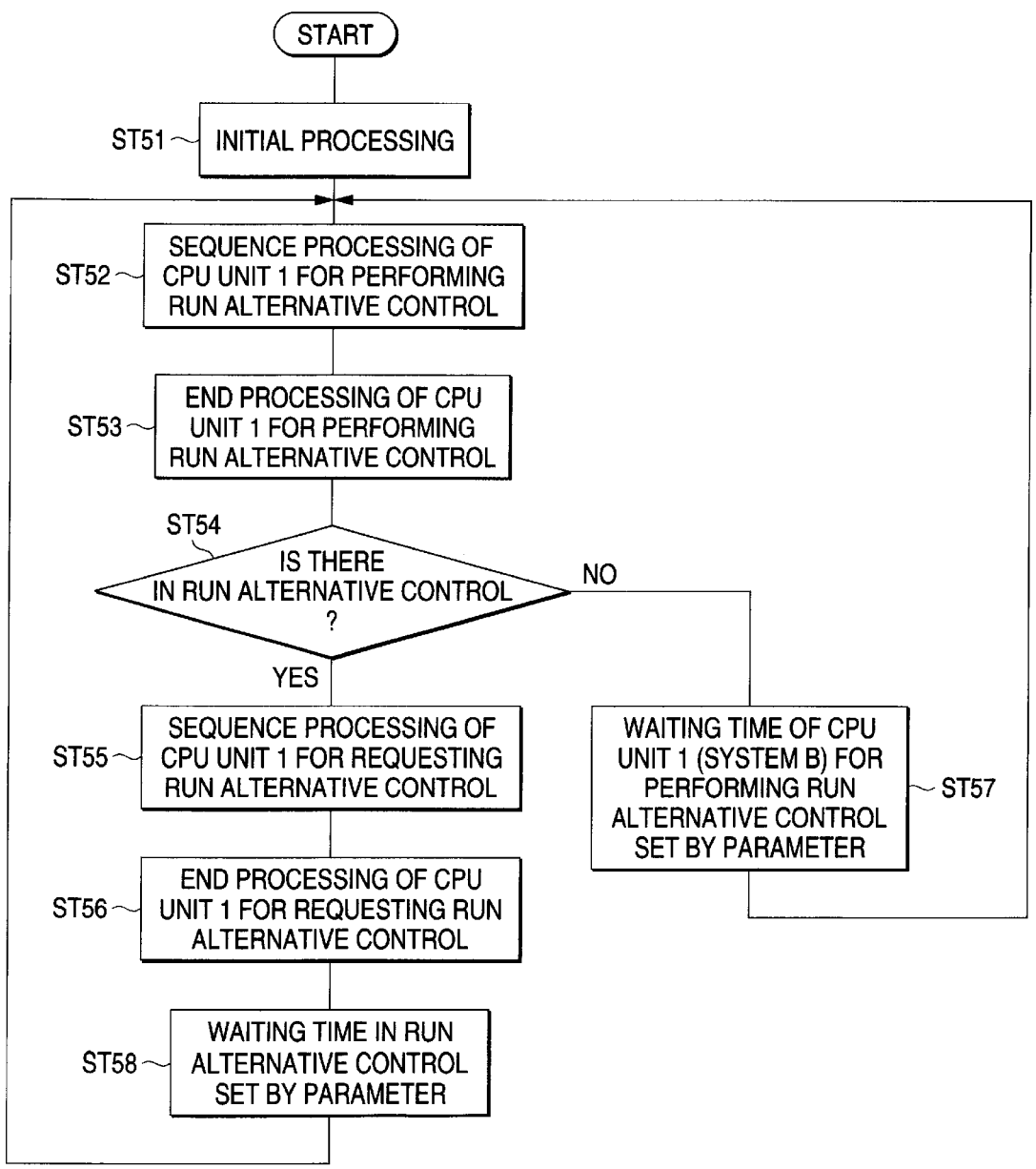
FIG. 7 is a processing flow showing processing in which a CPU unit receiving a request of run alternative control starts the run alternative control.

Next, a method in which the CPU unit 1B starts the run alternative control of the CPU unit 1A will be described using FIG. 7.

The CPU unit 1B performs sequence processing (step ST52) and END processing (step ST53) of the system B.

Then, when the CPU unit 1B detects an abnormality of the CPU unit 1A of an object to perform the run alternative control, the CPU unit 1B executes a sequence program present in the program area 64B based on the device memory area 65B and the parameter area 66B for CPU unit 1A, and starts run alternative execution of the system A for controlling the I/O unit 2A of the CPU unit 1A in which the abnormality has occurred.

After the CPU unit 1B performs sequence processing (step ST55) and END processing (step ST56) of the CPU unit 1A for performing the run alternative control, waiting is performed until it becomes the constant scan, which the user presets by the parameter, during the run alternative control (step ST58), and the sequence processing of the CPU unit 1B of the system B is again performed.

Similarly, also in case that an abnormality occurs in the CPU unit 1B due to a failure, the programmable controller CPU unit 1A starts run alternative execution.

Also, when run time writing for writing a sequence program into the CPU unit in a sequence program running state or a parameter for defining a CPU unit function, etc. is updated, information on the program area or the parameter area is updated respectively in like manner.

According to the embodiment, since a CPU for performing run alternative control stores data which a CPU unit of an object of the run alternative control holds during initial processing and at the time of END processing after completion of sequence processing, even if a CPU unit for requesting the run alternative control stops due to an abnormality, subsequently by another CPU unit, a predetermined sequence program is continuously executed without making a stop.

Also, when the unit in which the abnormality has occurred is replaced, sequence processing is continued by another unit, so that all the systems can subsequently be continued and system administration can be ensured and also, time necessary for recovery can be reduced.

Second Embodiment

A second embodiment of the invention will be described using FIG. 1, FIG. 8 and FIG. 9.

In the embodiment, means in which when an abnormality occurs due to a failure etc. in one of CPU units in a multi-CPU control system and a CPU unit for performing run alternative control of the CPU unit in which the abnormality has occurred is present, the CPU unit in which the abnormality has occurred is replaced with a CPU unit which normally operates by a user to return normally will be described and particularly, the means relates to a method of returning control to the replaced CPU unit from the CPU unit for performing the run alternative control.

Incidentally in the embodiment, the case that a CPU unit for performing run alternative control is the CPU unit 1B and a CPU unit (in which the abnormality has occurred) for requesting the run alternative control is the CPU unit 1A will be described by way of example.

Here, processing in which the replaced CPU unit 1A returns normally is added to the initial processing (step ST1), and processing in which the CPU unit 1B stops the run alternative control is added to the END processing (step ST3).

Figure 8:
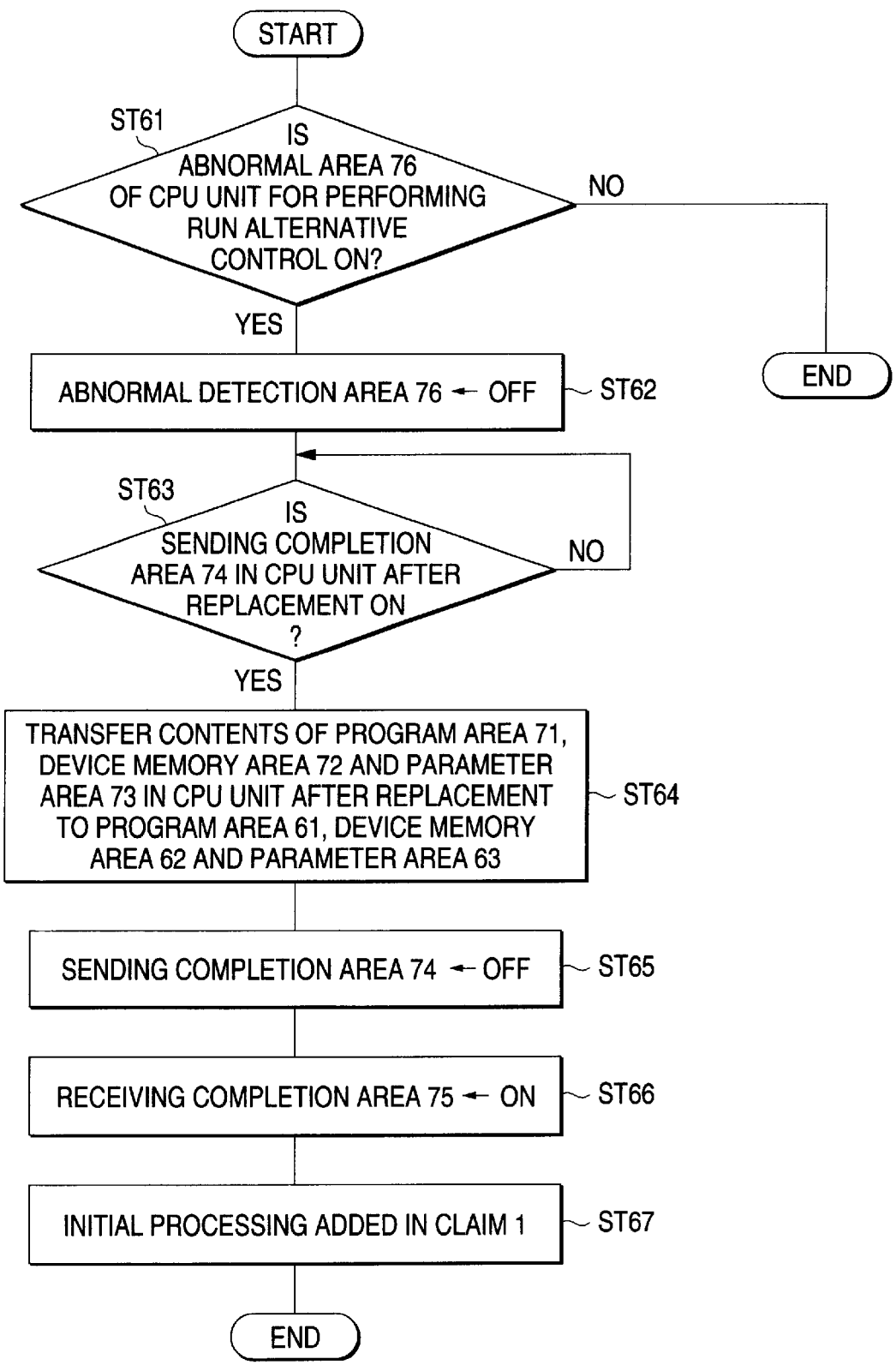
FIG. 8 is a processing flow showing processing in which the CPU unit which has performed the run alternative control stops the run alternative control and a CPU unit replaced due to an abnormality returns normally.
Figure 9:
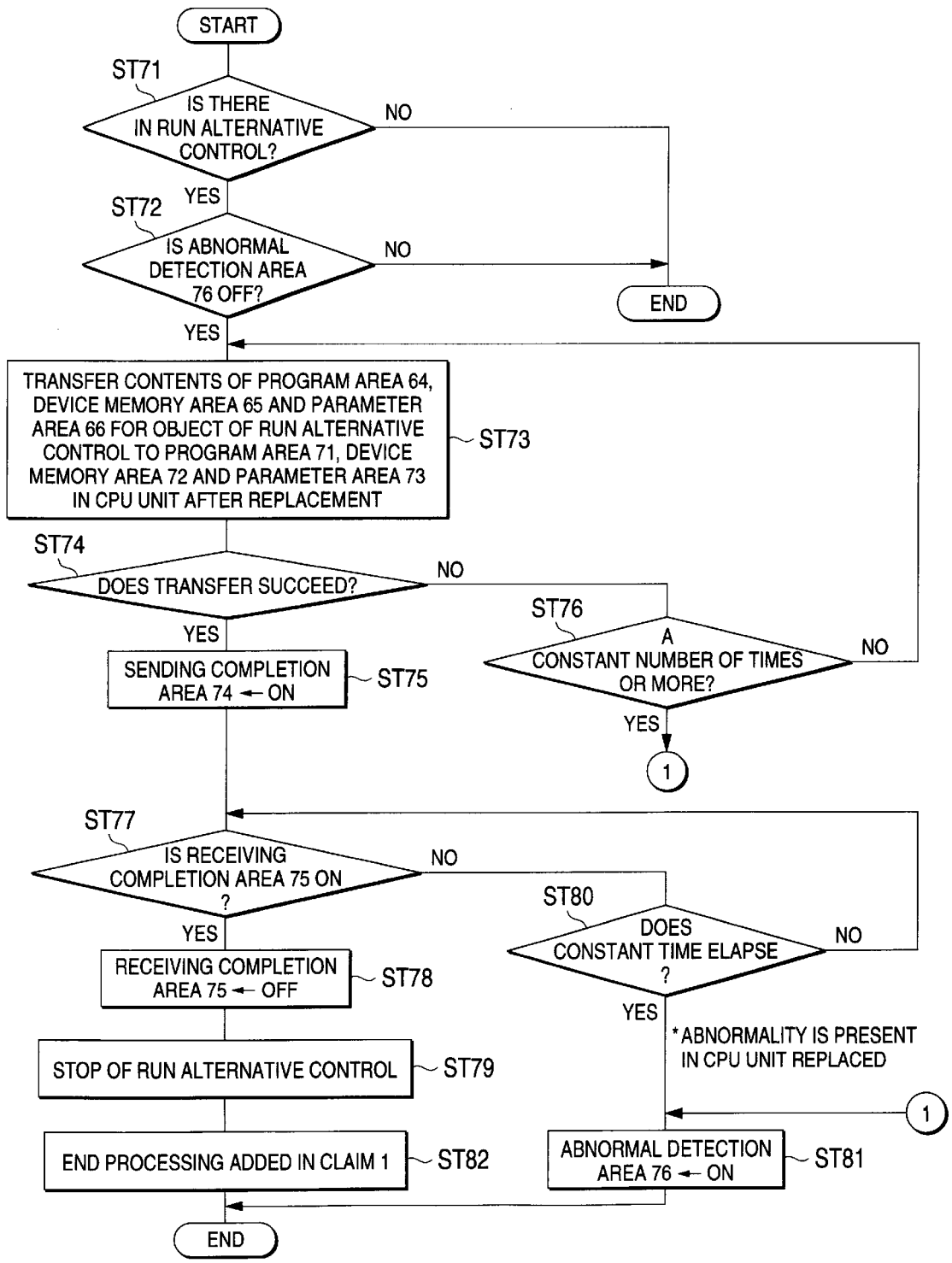
FIG. 9 is a processing flow in which the CPU unit which has performed the run alternative control stops the run alternative control.
Figure 10:
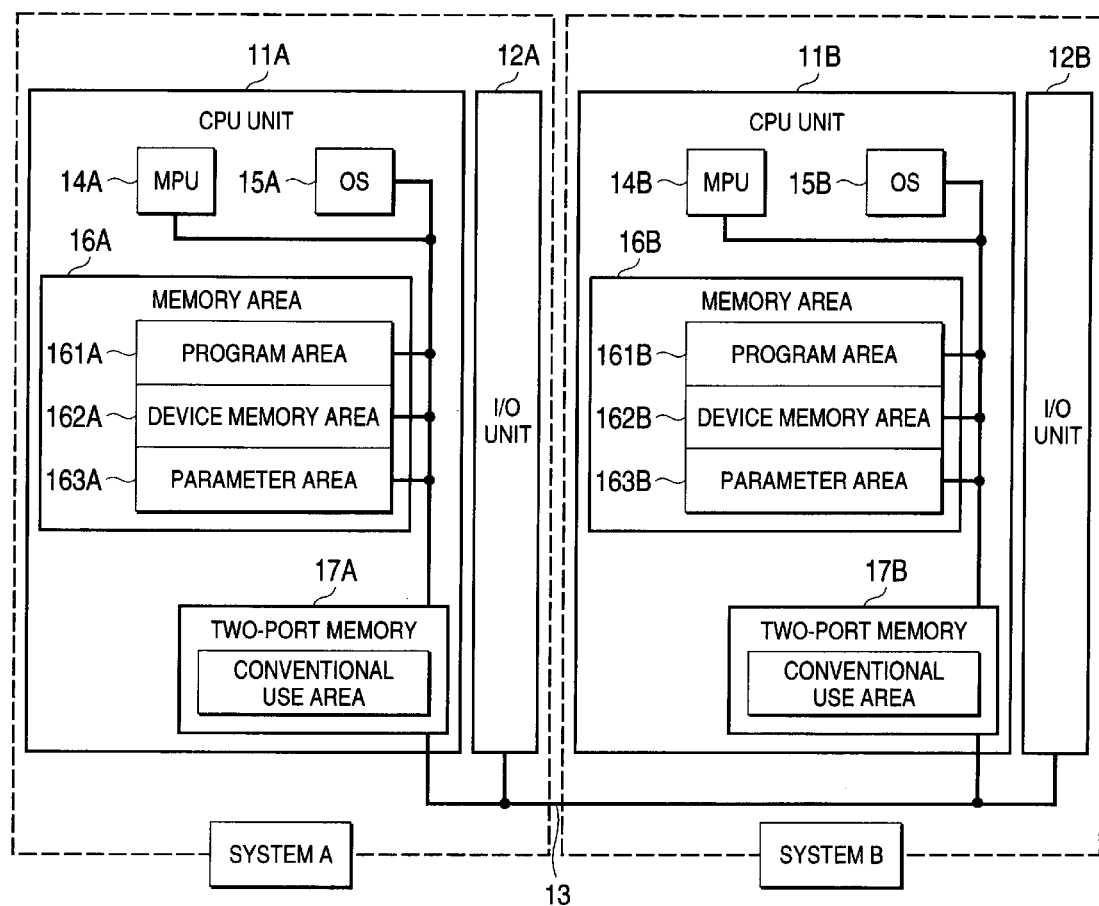
FIG. 10 is a schematic configuration diagram showing a schematic configuration in conventional multi-CPU control.

FIG. 8 is a processing flow showing processing in which the CPU unit 1B which has performed the run alternative control stops the run alternative control of the CPU unit 1A and the CPU unit 1A replaced due to an abnormality returns normally.

First, a user replaces the CPU unit 1A which has stopped due to an abnormality occurred during run alternative control of the CPU unit 1B with a CPU unit which normally operates, and mounts it in the position of the CPU unit 1A.

Then, in step ST61, the microprocessor 4A of the CPU unit 1A after replacement determines whether the abnormal detection area 76B of the CPU unit 1B is ON or not and if so, the abnormal detection area 65B is turned off in step ST62.

When the abnormal detection area 76B reporting that the abnormality of the CPU unit 1A has been eliminated becomes OFF, the microprocessor 4B of the CPU unit 1B which has performed the run alternative control transfers information on the program area 64B, the device memory area 65B and the parameter area 66B for CPU unit 1A to the program area 71A, the device memory area 72A and the parameter area 73A of the two-port memory 7A of the CPU unit 1A through the bus 3 and when the transfer succeeds, the sending completion area 74A is turned on.

In step ST63, the CPU unit 1A waits until the sending completion area 74A becomes ON and when the sending completion area 74A becomes ON, an operation proceeds to step ST64, and information on the program area 71A, the device memory area 72A and the parameter area 73A present on the two-port memory 7A is transferred to the program area 61A, the device memory area 62A and the parameter area 63A.

Then, when the transfer succeeds, the sending completion area 74A is turned off in step ST65 and thereafter, the receiving completion area 75B is turned on (step ST66).

Then, initial processing described in claim 1 in which the CPU unit 1A receives information on the program area 20B, the device memory area 21B and the parameter area 22B of the CPU unit 1B for performing run alternative control is performed, and the CPU unit 1A can recover the system A for controlling the I/O unit 2A.

Next, processing in which the CPU unit 1B which has performed run alternative control stops the run alternative control will be described using a processing flow of FIG. 9.

In step ST71, the CPU unit 1B requested to perform the run alternative control determines whether there is in the run alternative control of the CPU unit 1A or not and if the run alternative control is being performed, an operation proceeds to step ST72 and the abnormal detection area 76B is checked in order to determine whether the CPU unit 1A of an object of the run alternative control returns or not.

When the abnormal detection area 76B is OFF, it is indicated that an abnormality of the CPU unit 1A of the object of the run alternative control has been eliminated, so that the microprocessor 4B of the CPU unit 1B transfers information on the program area 64B, the device memory area 65B and the parameter area 66B for CPU unit 1A to the program area 71A, the device memory area 72A and the parameter area 73A on the two-port memory 7A through the bus 3 in step ST73.

Then, in step ST74, it is determined whether the transfer succeeds or not and when the transfer succeeds, the sending completion area 74A is turned on (step ST75) and when the transfer fails by a specified number of times or more (step ST76), the abnormality of the CPU unit 1A has not been eliminated, so that the abnormal detection area 76B is again turned on (step ST81) and END processing is ended and the run alternative control by the CPU unit 1B is continued.

Also, in the CPU unit 1A, by turning on the sending completion area 74A, the CPU unit 1A after replacement transfers information on the program area 71A, the device memory area 72A and the parameter area 73A present on the two-port memory 7A to the program area 61A, the device memory area 62A and the parameter area 63A, and it is determined whether the receiving completion area 75B informed in the case of the transfer completion becomes ON or not in step ST77.

Then, when the receiving completion area 75B becomes ON, in step ST78, the receiving completion area 64B is turned off and then, the run alternative control of the CPU unit 1A is stopped (step ST79) and END processing described in claim 1 in which information on the program area 61B, the device memory area 62B and the parameter area 63B of the CPU unit 1B is given to the CPU unit 1A for performing the run alternative control is performed.

On the other hand, when the receiving completion area 75B does not become ON even if constant time elapses (step ST80), it is indicated that the abnormality of the CPU unit 1A has not been eliminated, so that the abnormal detection area 75B is again turned on (step ST81) and END processing is ended and the run alternative control by the CPU unit 1B is continued.

Even when it is assumed that the CPU unit 1B is a unit in which an abnormality occurs and the CPU unit 1A is a unit for performing run alternative control, by similar processing, the CPU unit 1B will recover the system B for controlling the I/O unit 2.

According to the embodiment, since data required by the CPU unit after abnormal replacement during initial processing and at the time of END processing after completion of sequence processing is transferred subsequently from the CPU unit which has performed run alternative control, a user only replaces the CPU unit in which the abnormality has occurred with another normal CPU unit, and inputs of a sequence program, device data, a parameter for defining a function of the CPU unit, etc. by the user are newly not required and time necessary for recovery can be reduced.

Incidentally, in the multi-CPU control according to the first and second embodiment, a plurality of CPU units can be constructed and, for example, in the case comprising CPU units A, B and C, the CPU unit B is used as a CPU unit for performing run alternative control of the CPU unit A and the CPU unit C is used as a CPU unit for performing run alternative control of the CPU unit B and the CPU unit A is used as a CPU unit for performing run alternative control of the CPU unit C, and the initial processing and the processing at the time of the END processing described above are mutually executed and thereby achievement can be made.

Also, a plurality of other units such as an intelligent function unit such as a positioning unit for controlling a positioning device etc. other than the I/O unit can be constructed.

INDUSTRIAL APPLICABILITY

As described above, a CPU unit and a run alternative control method of a programmable controller according to the invention are suitable for use in a multi-CPU system for performing distributed control by a plurality of CPU units.

What is claimed is:

1. A CPU unit of a programmable controller, comprising:
a microprocessor for controlling control object equipment based on a sequence program and predetermined stored data;
a memory area for introducing and storing a second sequence program at a time of an initial processing on system activation, and storing second predetermined data at a time of END processing after completion of a sequence processing; and
a preset run alternative control object unit uses the second sequence program and the second predetermined data while storing the sequence program and the predetermined data,
wherein when the microprocessor detects an abnormality of the run alternative control object unit, the run alternative control object unit is controlled based on the second sequence program and the second predetermined data after the completion of a predetermined sequence processing in the run alternative control object unit.

2. The CPU unit of a programmable controller as claimed in claim 1, characterized in that when the second sequence program and the second predetermined data are stored in the memory area, they are acquired from the run alternative control object unit connected through an internal bus via shared memory.

3. The CPU unit of a programmable controller as claimed in claim 2, characterized in that an area for storing the second sequence program and the second predetermined data is provided in the shared memory and the data written from the run alternative control object unit is acquired in the memory area with reference to a predetermined decision flag.

4. The CPU unit of a programmable controller as claimed in claim 2, characterized in that it is determined whether there is an abnormality of the run alternative control object unit or not based on the presence or absence of writing of the second predetermined data written from the run alternative control object unit through the shared memory.

5. A CPU unit of a programmable controller, comprising:
a microprocessor for controlling control object equipment based on a sequence program and predetermined data stored; and
a memory area for storing a second sequence program and second predetermined data which a preset run alternative control object unit uses while storing the sequence program and the predetermined data,
characterized in that wherein when the microprocessor detects an abnormality of the run alternative control object unit, the run alternative control object unit is controlled based on the second sequence program and the second predetermined data stored in the memory area after the completion of predetermined sequence processing in the run alternative control object unit, and
characterized in that wherein transfer means is provided for transferring the previously received second sequence program and the second predetermined data to the recovered run alternative control object unit when it is detected that the run alternative control object unit has recovered from an abnormality.

6. A run alternative control method of a programmable controller, comprising:
a first step of acquiring a sequence program, at the time of an initial processing on system activation, which is necessary to control a run alternative control object unit, a device and a parameter for run alternative control object unit at the time of an END processing after completion of a sequence processing of the run alternative control object unit;
a second step of detecting an abnormality of the run alternative control object unit; and
a third step of controlling the run alternative control object unit based on the information acquired in the first step after the completion of predetermined sequence processing in the run alternative control object unit when the abnormality of the run alternative control object unit has been detected.

7. A run alternative control method of a programmable controller, comprising:
a first step of acquiring information that includes a sequence program, a device and a parameter for a run alternative control object unit necessary to control the run alternative control object unit;
a second step of detecting an abnormality of the run alternative control object unit;
a third step of controlling the run alternative control object unit based on the information acquired in the first step after the completion of predetermined sequence processing in the run alternative control object unit when the abnormality of the run alternative control object unit has been detected; and a fourth step for transferring the previously received sequence program, the device and the parameter for run alternative control object unit to the recovered run alternative control object unit when it is detected that the run alternative control object unit has recovered from an abnormality.

* * * * *